United States Patent
Rao et al.

(10) Patent No.: US 7,467,210 B1
(45) Date of Patent: Dec. 16, 2008

(54) METHOD AND SYSTEM FOR AUTOMATICALLY COLLECTING INFORMATION RELATING TO CALLS TO ONE OR MORE ASSOCIATED ENDPOINT DEVICES

(75) Inventors: Anup V. Rao, San Jose, CA (US); David R. Oran, Action, MA (US)

(73) Assignee: Cisco Technology, Inc., San Jose, CA (US)

( * ) Notice: Subject to any disclaimer, the term of this patent is extended or adjusted under 35 U.S.C. 154(b) by 1024 days.

(21) Appl. No.: 10/816,995

(22) Filed: Apr. 2, 2004

(51) Int. Cl.
*G06F 15/16* (2006.01)
*G06F 12/00* (2006.01)

(52) U.S. Cl. ...................... 709/228; 709/217
(58) Field of Classification Search .............. 709/227, 709/228, 217, 218, 250
See application file for complete search history.

(56) References Cited

U.S. PATENT DOCUMENTS

| | | | |
|---|---|---|---|
| 6,041,108 A * | 3/2000 | Brewster et al. | 379/196 |
| 6,363,065 B1 * | 3/2002 | Thornton et al. | 370/352 |
| 6,970,909 B2 * | 11/2005 | Schulzrinne | 709/206 |
| 7,076,040 B2 | 7/2006 | Carson et al. | 379/115.01 |
| 2002/0147818 A1 * | 10/2002 | Wengrovitz | 709/228 |

* cited by examiner

*Primary Examiner*—Zarni Maung
(74) *Attorney, Agent, or Firm*—Stolowitz Ford Cowger LLP

(57) ABSTRACT

A method and system for automatically collecting information relating to calls. A method is described for collecting call information that establishes one or more subscription sessions with one or more endpoint devices. Each of the one or more endpoint devices is associated with an address of record. Then, the method receives a dialog notification in one of the one or more subscription sessions that an endpoint device has received a call from a caller. A call entry is generated that provides call information that is associated with the call and the caller. Thereafter, the call entry is stored in a chronological call history that provides call information that is associated with one or more of calls to the one or more endpoint devices.

45 Claims, 5 Drawing Sheets

US 7,467,210 B1

METHOD AND SYSTEM FOR AUTOMATICALLY COLLECTING INFORMATION RELATING TO CALLS TO ONE OR MORE ASSOCIATED ENDPOINT DEVICES

BACKGROUND OF THE INVENTION

1. Field of the Invention

Embodiments of the present invention relate to the field of storing contact information. More particularly, embodiments of the present invention relate generally to a personal call history recorder using Session Initiation Protocol dialog subscriptions.

2. Related Art

The expansion of communication networks provides for numerous means for communicating with an individual or entity. For example, a single individual may be associated with any one of a number of associated communication devices through which communication may be established using any type of communication media. That is, the individual may communicate through a cell phone, a personal digital assistant, a computer workstation at work or at home, etc.

Each of the individual communication devices may have a means for collecting and storing call information directed to each of the specific devices. That is, for a particular communication device, a call log may be kept recording call information related to calls that are directed to the communication device. This collection and storage may even be accomplished automatically by the communication device. for example, a cell phone may keep a list of recent calls to the cell phone. This call log can be accessed to obtain pertinent call information, such as phone numbers, names, when calls were made to the communication device, etc.

However, for particular devices with small amounts of memory, the call log may be volatile, or incapable of storing useful amounts of call information. That is, the communication device may be limited in memory so that only a minimum of entries (e.g., the last ten calls) are stored in the call log. In addition, the call log may be erased whenever the communication device is powered off in an effort to save memory. In this case, the call log is of limited use, since only a small amount of information may be recorded.

In addition, the information in call logs is usually specific to the communication device that collects the information. That is, while one communication device may collect and store call information, other associated communication devices do not store that call information. In this case, important call information that can be used may not be accessible by an individual if that individual does not have current access to the particular communication device that contains the specific call information.

For example, an individual may receive a call from a caller through a computer workstation based at a work location. The computer workstation may collect and store the call information related to the call in order to facilitate the individual contacting the previous caller at a later time. However, the call information that is stored on the computer workstation is not useful to the individual when the individual later leaves the work location and only has access to a cell phone that does not include the call information associated with the previous caller.

SUMMARY OF THE INVENTION

Accordingly, various embodiments of the present invention are described illustrating a method and system for recording information relating to calls using Session Initiation Protocol (SIP) dialog subscriptions to one or more associated endpoint devices. Embodiments of the present invention provide for permanent storage of a chronological history of call information corresponding to calls made to one or more associated SIP compatible endpoint devices. Embodiments of the present invention are capable of interfacing with any SIP endpoint device as it uses the standard SIP communication protocol, or its derivatives. In addition, embodiments of the present invention are capable of interfacing with any SIP compatible endpoint device regardless of the physical location of the SIP compatible endpoint device or its mobility. Moreover, embodiments of the present invention are capable of recording call information for direct calls to endpoint devices that are not connected through a proxy server since an SIP dialog/notification session has already been established between the endpoint device receiving the call and the control module controlling the personal call history.

Embodiments of the present invention provide for a method and system for automatically collecting information relating to calls. Specially, an embodiment of the present invention is a method for automatically collecting call information related to calls to a one or more associated endpoint devices. The method establishes one or more subscription sessions with the one or more endpoint devices. Each of the one or more endpoint devices is associated with an address of record. Then, the method receives a dialog notification in one of the one or more subscription sessions that an endpoint device has received a call from a caller. A call entry is generated that provides call information that is associated with the call and the caller. Thereafter, the call entry is stored in a chronological call history that provides call information that is associated with one or more calls to the one or more endpoint devices.

In addition, another embodiment of the present invention is a system for automatically collecting call information related to calls to one or more associated endpoint devices. The system comprises one or more associated SIP compatible endpoint devices, each of which is associated with a single address of record. The one or more SIP compatible endpoint devices establishes communication sessions using SIP. In addition, the system comprises a registrar for registering the one or more SIP compatible endpoint devices on a communication network. That is, the registrar tracks when specific SIP compatible endpoint devices can communicate with other endpoint devices. The system also comprises a proxy server for routing calls to each of one or more SIP compatible endpoint devices.

The system also comprises a control module for chronologically collecting call information associated with one or more calls directed to one or more SIP compatible endpoint devices over existing SIP dialog/notification sessions. The one or more SIP compatible endpoint devices is remotely located from the control module. In addition, each of the one or more SIP compatible endpoint devices is associated with an address of record. The system also comprises an updated personal call history for permanently storing the call information.

DETAILED DESCRIPTION OF THE INVENTION

Reference will now be made in detail to the preferred embodiments of the present invention, a method and system of automatically recording call information for calls to one or more associated endpoint devices, examples of which are illustrated in the accompanying drawings.

Accordingly, various embodiments of the present invention are described illustrating a method and system for recording information relating to calls using Session Initiation Protocol (SIP) dialog subscriptions to one or more associated endpoint devices. Embodiments of the present invention provide for permanent storage of a chronological history of call information corresponding to calls made to one or more associated endpoint SIP devices. Embodiments of the present invention are capable of interfacing with any SIP endpoint device as it uses the standard SIP communication protocol, or its derivatives. In addition, embodiments of the present invention are capable of interfacing with any SIP endpoint device regardless of the physical location of the SIP endpoint device or its mobility. Moreover, embodiments of the present invention are capable of recording call information for direct calls to endpoint devices that are not connected through a proxy server since an SIP dialog/notification session has already been established between the endpoint device receiving the call and the control module controlling the personal call history.

NOTATION AND NOMENCLATURE

Figure 1:
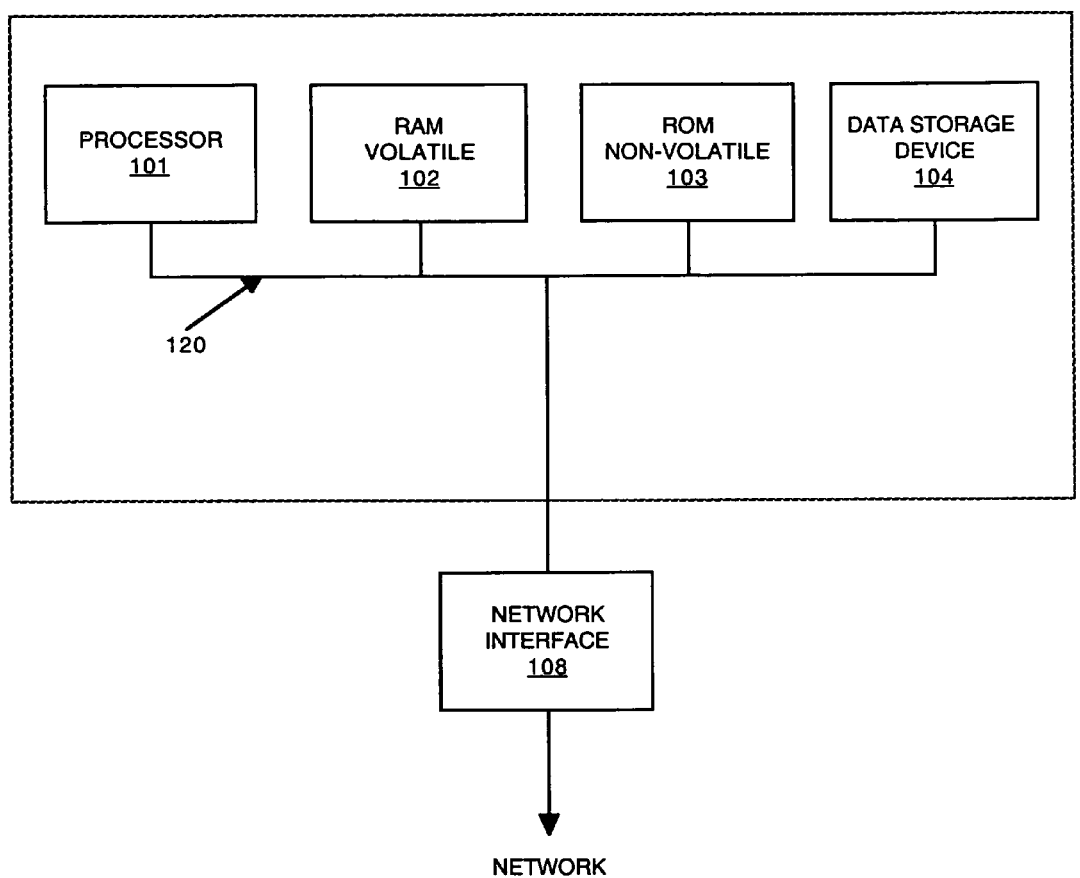
FIG. 1 is a block diagram of an electronic device that is capable of automatically recording call information related to calls made to one or more associated Session Initiation Protocol (SIP) compatible endpoint devices, in accordance with one embodiment of the present invention.

Referring now to FIG. 1, portions of the present invention are comprised of computer-readable and computer-executable instructions which reside, for example, in computer-readable media of an electronic system, such as a personal computer, cell phone, personal digital assistant, server computer, mainframe, networked computer, workstation, and the like. FIG. 1 is a block diagram of interior components of an exemplary electronic system 100, upon which embodiments of the present invention may be implemented.

Exemplary electronic system 100 includes an address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary electronic system 100 also includes an optional data storage device 104 (e.g., memory card, hard drive, etc.) coupled with the bus 120 for storing information and instructions. Data storage device 104 can be removable. With reference still to FIG. 1, a network interface 108 (e.g., signal input/output device) is provided which is coupled to bus 120 for providing a communication link between electronic system 100 and a network environment. As such network interface 108 enables the central processor unit 101 to communicate with or monitor other electronic systems or coupled to a communication network.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "establishing," "receiving," "generating," and "storing," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Method and System for Automatically Recording Call Information

Embodiments of the present invention establish communication between endpoint devices through a communication protocol, such as the SIP protocol. Specifically, SIP enables endpoint devices to discover one another and allows the endpoint devices to agree on a characterization of a session they would like to share. In general, SIP is a signaling protocol used for establishing sessions in an Internet Protocol (IP) network, or any other network that supports SIP. A session could be two-way telephone call or a collaborative multimedia conference session. While embodiments of the present invention are described using SIP to establish, manage, and terminate communication sessions within a communication environment, other embodiments are well suited to other communication protocols that perform substantially the same functions as SIP to establish, manage, and terminate communication sessions in a communication environment.

While embodiments of the present invention are described within the environment of SIP calls through an IP network, other embodiments of the present invention are well suited to recording call information for SIP made through any communication network that supports SIP, such as an SIP compatible communication environment.

One of the strengths of SIP is the capability to associate various endpoint devices to a single address, or "address of record" (AOR). That is, SIP in association with communication protocols, such as hypertext transfer protocol (HTTP) and simple mail transfer protocol (SMTP), and the like, can identify a user via a single universal resource locator (URL) that is then associated with SIP compatible endpoint devices, such as a phone number, or a host name. In this way, SIP allows for communication sessions to be established using much of the infrastructure already in place for e-mail and the web. As such, as a communication session is established, SIP can create an appropriate call environment based on the functions selected by the user, such as selecting the media format (e.g., voice, video, text, multimedia, etc.).

Figure 2:
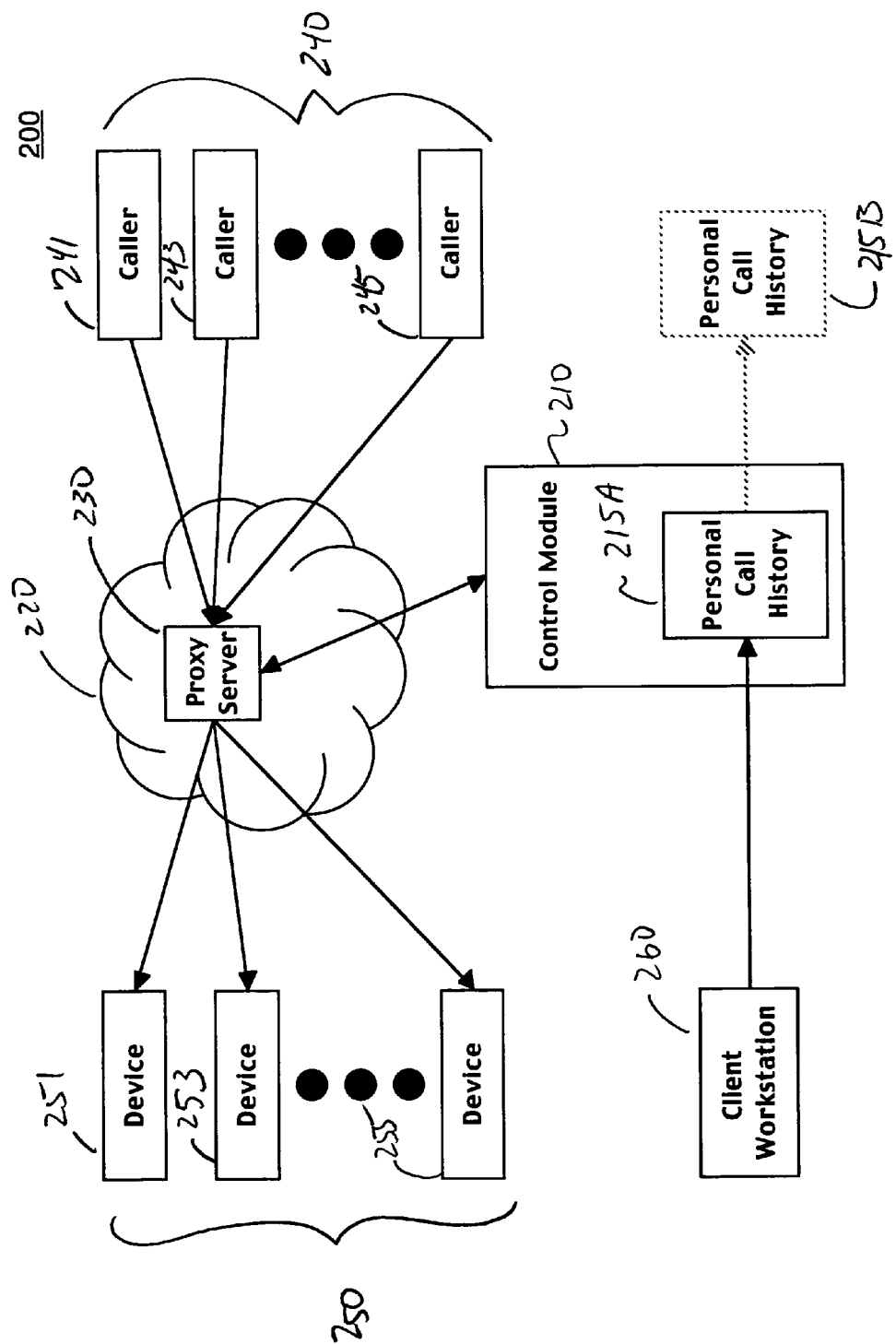
FIG. 2 is a block diagram of a system that is capable of supporting the automatic recordation of call information related to calls made to one or more associated SIP compatible endpoint devices, in accordance with one embodiment of the present invention.

Now referring to FIG. 2, a block diagram of a system 200 that is capable of supporting the automatic recordation of call information relating to calls to one or more associated SIP compatible devices 250 is described, in accordance with one embodiment of the present invention. In the present invention, the system 200 is described within an SIP compatible communication environment. That is, communication sessions conducted within the system 200 are established, managed, and terminated using SIP.

The system 200 is capable of collecting call contact information related to calls to the one or more associated SIP compatible endpoint devices 250, including endpoint device 251, 253, and 255, etc. In particular, the system 200 comprises the one or more SIP compatible endpoint devices 250, a proxy server 230, a control module 210, and a personal call history 215A or 215B, as well as one or more callers 240 and a client workstation 260.

As shown in FIG. 2, the system 200 establishes communication sessions between endpoints in the system 200 through SIP. For example, devices associated with the one or more callers 240 establish communication sessions with the one or more associated SIP compatible endpoint devices 250 through a network, such as the Internet 220. Because each of the one or more associated SIP compatible endpoint devices 250 is associated with a single AOR, calls from the one or more callers 240 to the one or more associated SIP compatible endpoint devices 250 can be routed through the proxy server 230.

The proxy server 230 properly routes calls to corresponding SIP compatible endpoint devices according to rules set up by the user that is associated with the one or more SIP compatible endpoint devices 250. For example, a call from a caller device 241 in the one or more calling devices 240 that include callers 241, 243, and 245, etc., is routed to the appropriate SIP endpoint device (e.g., device 251) by the proxy server 230. The proxy server 230 is capable of properly routing calls by communicating with the personal call history 215A or 215B that is controlled by the control module 210, in one embodiment, as will be described in full below.

In addition, in one embodiment, the control module 210 is capable of chronologically collecting call information associated with one or more calls directed to the one or more SIP compatible endpoint devices 250 over existing SIP dialog/notification sessions. This is accomplished with the help of a registrar (not shown) that tracks when each of the one or more associated SIP compatible endpoint devices register to the system so that calls can be properly routed to the endpoint device by the proxy server 230. When a specific SIP compatible endpoint device, in the one or more associated SIP compatible endpoint devices, registers using the AOR, an SIP dialog/notification session is established between the endpoint device and the control module 210 so that when calls are made to the specific endpoint device, that device will notify the control module of that fact. In this case, the control module 210 is acting on the behalf of the user and can logically be granted authorization to subscribe to the dialog state of the AOR of the user in question.

In general, the control module 210 initiates the subscriptions to the associated SIP compatible endpoint devices, receives the notifications (a notify message) that a call has been made to one of the associated SIP compatible endpoint devices, and subsequently records call information into the personal call history 215A or 215B. As such, the control module 210 discovers and sends subscribe messages to each of the devices that are registered to a single AOR to establish SIP dialog notification sessions with each of the associated SIP compatible endpoint devices 250.

In particular, as calls come in to the one or more associated SIP compatible endpoint devices 250, through SIP dialog/notification sessions, the control module is notified of the call and can record the call information in the personal call history 215A or 215B. The notification occurs even when calls to the one or more associated SIP compatible endpoint devices 250 are not made through the proxy server 230 since SIP dialog/notification sessions have been set up between the control module 210 and each of the registered SIP compatible endpoint devices.

The personal call history 215A or 215B comprises an updated log that contains the personal call history or call information for calls to the one or more associated SIP compatible endpoint devices 250. In one embodiment, the personal call history is continuously updated. The personal call history 215A or 215B is capable of permanently storing the call information. For example, the personal call history 215A or 215B contains one or more call entries comprising call information, such as the SIP dialog notification informing the control module 210 when an SIP compatible endpoint device is being called, the date of the call, and the time of the call. In other embodiments, other information included within the call information includes contact information associated with the caller and/or calling device obtained through SIP.

As shown in FIG. 2, the personal call history can be co-located with the control module, as in personal call history 215A, or remotely located from the control module 210, as in personal call history 215B. In the case where the personal call history 215A is co-located with the control module 210, the control module provides the dual function of recording and accessing the call information contained within the personal call history 215A. In this case, information contained within the personal call history 215A is accessed directly through the control module 210. For example, a client workstation 260 that is independent of the one or more associated SIP compatible endpoint devices 250, or one of the one or more associated SIP compatible endpoint devices 250 accesses the call information through the control module 210.

In the case where the personal call history 215B is remotely located, information contained within the personal call history 215B is accessed directly through the personal call history 215B. For example, either the client workstation 260 that is independent of the one or more associated SIP compatible endpoint devices 250, or one of the one or more associated SIP compatible endpoint devices 250, can establish a direct communication session with the personal call history 215B to access call information.

In another embodiment, a dialog state aggregator (DSA) configuration is implemented for collecting and recording call information to one or more of the associated SIP compatible endpoint devices 250. In this case, the control module 210 is independent from the DSA (not shown). As such, the DSA performs the discovery of the associated SIP compatible endpoint devices 250. Once the DSA discovers the associated SIP compatible endpoint devices 250 that are registered to a single AOR, the DSA sends subscribe messages to each of the associated SIP compatible endpoint devices 250 to establish SIP dialog notification sessions. In addition, the DSA receives and collates the notifications from each of the associated SIP compatible endpoint devices 250 that a call has been made.

One of the benefits of implementing a DSA configuration is that the control module 210 need only to send a single SIP 'SUBSCRIBE' message for subscription between the control module 210 and the DSA to receive call information that the DSA collects. In this way, the control module 210 receives the call information from the DSA and makes entries in the personal call history 215A or 215B as appropriate. Also, in other embodiments the DSA performs generically and could serve entities other than the control module 210.

Figure 3:
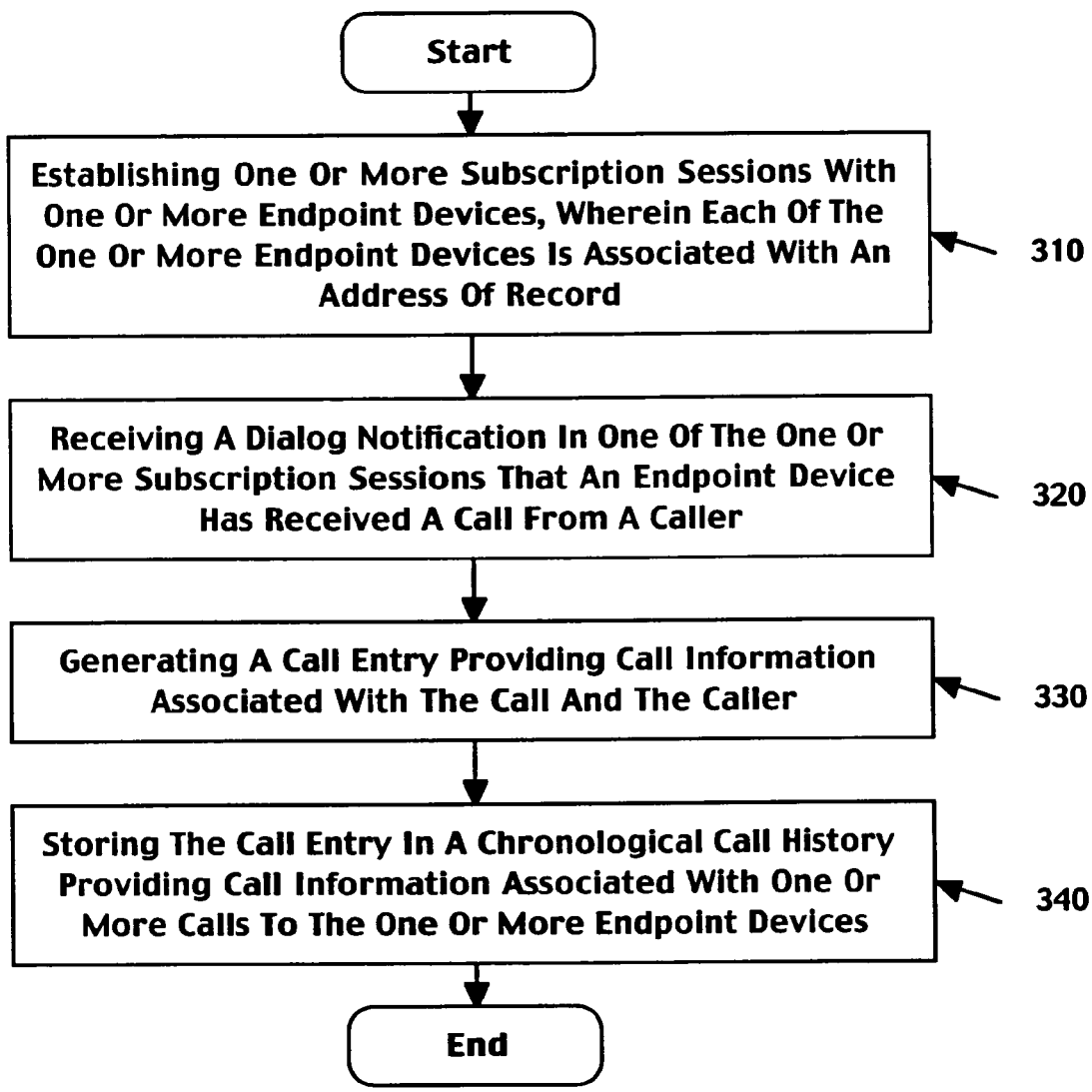
FIG. 3 is a flow chart illustrating steps in a computer implemented method for automatically recording call information related to calls made to one or more associated SIP compatible endpoint devices, in accordance with one embodiment of the present invention.

FIG. 3 is a flow diagram 300 illustrating steps in a computer implemented method for automatically collecting call contact information, in accordance with one embodiment of the present invention. The method as disclosed in flow diagram 300 is implemented within an SIP environment for establishing, managing, and terminating communication sessions within a communication network, in one embodiment.

At 310, the method begins by establishing one or more subscription sessions with one or more endpoint devices. In a network of one or more endpoint devices, each of the one or more endpoint devices are comprised of SIP compatible devices located in various locations within a communication network. In addition, each of the one or more endpoint devices are associated with a single address of record (AOR). Typically, the AOR is associated with a particular user. In this way, a particular user can use a single URL to enable callers to contact the user through any of the one or more endpoint devices using any type of media.

In one embodiment, one or more subscription sessions are established by sending a 'SUBSCRIBE' message to the registrar that collects SIP registration packages from each of the one or more endpoint devices that is associated with the single AOR. In this way, all of the contact addresses of the SIP compatible endpoint devices that have registered and are associated with the AOR can be obtained. Thereafter, a 'SUBSCRIBE' message is sent to each of the one or more SIP compatible endpoint devices that have registered against the AOR. As such, a dialog subscription is set up with those registered SIP compatible endpoint devices.

Correspondingly, the present embodiment is capable of terminating the subscription session. That is, when the present embodiment receives another SIP notification that indicates that an endpoint device has unregistered against the AOR, then the present embodiment terminates the subscription session to that device, and the endpoint device is no longer associated with the one or more endpoint devices.

At 320, the present embodiment continues by receiving a dialog notification, such as an SIP 'NOTIFICATION' message, in one of the one or more subscription sessions that an endpoint device has received a call from a caller. That is, the established dialog subscription sessions enable each of the one or more endpoint devices associated with the AOR to send a notification message that a call has been received. The calls that trigger a notification can include incoming calls, outgoing calls, transferred calls, etc. In addition, the calls need not be routed through a proxy server for the notification message to be generated by the endpoint device that received a call.

At 330, the present embodiment generates a call entry that provides call information that is associated with the call and the caller. For instance, the call information in the log entry includes the dialog notification sent by the endpoint device, the date and the time of the call, contact information of the caller, etc.

At 340, the present embodiment stores the call entry in a chronological call history. The chronological call history provides the call information that is associated with the one or more calls to the one or more endpoint devices that are associated with the single AOR.

To automatically record multiple log entries, for every dialog notification received from any of the one or more endpoint devices that are associated with the AOR, a log entry is created that includes the associated call information. For instance, to record multiple log entries, the present embodiment receives another SIP notification that another endpoint device has received a call, a separate call. The present embodiment then generates another call entry that provides the call information associated with this separate call. Thereafter, the present embodiment stores this new call entry in the chronological call history.

The present embodiment also provides access to the chronological call history. Since the chronological call history is permanently stored, in one embodiment, in this manner, call information that is related to calls to the one or more endpoint devices associated with the single AOR can be obtained. As such, a permanent repository of call information may be kept for later access years from when the call information was collected. This permanent repository can be protected from destruction using various protection schemes (e.g., backup) than call histories that are stored on the endpoint devices which can be lost or replaced.

In another embodiment, a filter is applied to the call information. In this way, a back end server provides services utilizing the call information that is beneficial to the user. For instance, in one embodiment a running display of the chronological call history is displayed for ready access by a user. The running display has up to date statistics regarding each of the one or more endpoint devices associated with the single AOR. For example, the filters may provide a running counter that tracks the amount of time the user is on a particular endpoint device, or on any combination of endpoint devices. The counter can be set up for any time interval. A message may be triggered to be generated and sent to the user when the counter exceeds a particular threshold to notify the user how much time the user has logged on a particular endpoint device, or group of endpoint devices.

Other potential uses include filters that are directed to tracking calls from particular devices, or entities. For example, one embodiment can use a filter to track calls made by a user's boss, or spouse, etc. In addition, filters can be created that track performance, for instance, how many times a particular rules engine was implemented to reject telemarketing calls, or to track the number of dropped calls.

In addition, in other embodiments, a rule is created that is based on the log entry. For instance, a log entry can be clicked to create a rule. For example, rules are set up to perform various options, such as classifying calls based on the caller to important or nuisance, wherein important callers are rerouted to a specific endpoint device that a user always answers, and a nuisance caller can be directed directly to voice mail, or to a third party, etc.

Figure 4:
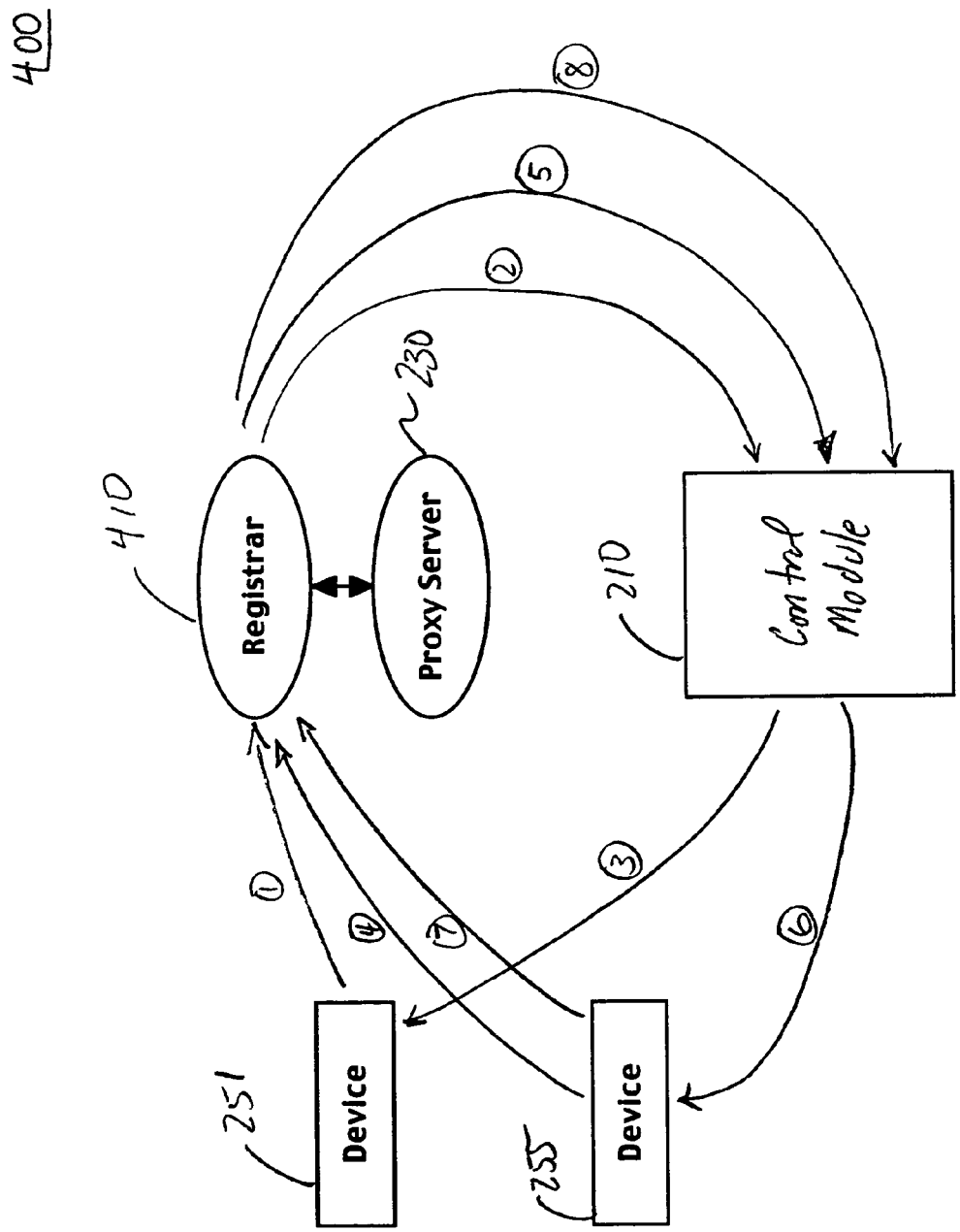
FIG. 4 is a data flow diagram illustrating the process used for establishing an SIP dialog/notification session in order to facilitate the automatic recordation of call information related to calls made to one or more associated SIP compatible endpoint devices, in accordance with one embodiment of the present invention.

FIG. 4 is data flow diagram 400 illustrating the flow of information used for establishing an SIP dialog/notification session in order to facilitate the automatic recordation of call information related to calls made to one or more associated SIP compatible endpoint devices, in accordance with one embodiment of the present invention. The flow diagram 400 is implemented within a system as described in FIG. 2, in one embodiment.

As such, the system as shown in data flow diagram 400 comprises associated SIP compatible endpoint devices 251 and 255, each of which is associated with a single AOR. In addition, the system comprises a registrar 410 for registering the SIP compatible endpoint devices 251 and 255 on a communication network. That is, the registrar tracks the SIP compatible endpoint devices 251 and 255 registered against the AOR. In this way, the endpoint devices 251 and 255 can communicate with other endpoint devices. The system also comprises a proxy server 230 for routing calls to the SIP compatible endpoint devices 251 and 255. In addition, the control module 210 collects call information associated with calls directed to one or more SIP compatible endpoint devices associated with a single AOR over SIP dialog/notification sessions. In this way, a continuously updated personal call history is generated and permanently stores the call information.

As shown in FIG. 4, path-1 illustrates the process by which the SIP compatible endpoint device 251 registers with the registrar 410 to be associated with a particular AOR. Specifically, the device 251 sends an SIP 'REGISTER' message to the registrar 410. In this way, the registrar 410 can write information to a registration or location database that the proxy server 230 can access when necessary. As such, the proxy server 230 is able to route calls to the SIP compatible endpoint device 251.

Previous to the process in path-1, the present embodiment registers the control module 210 with the registrar 410. In this way, the control module 210 is able to instruct the registrar 410 to send to the control module 210 an SIP 'NOTIFICATION' message whenever an SIP compatible endpoint device has registered against the specific AOR.

As such, along path-2 an SIP 'NOTIFICATION' message is sent by the registrar 410 informing the control module 210 that device 251 has registered against the specific AOR.

Along path-3, the control module 210 sends an SIP 'SUBSCRIBE' message to the device 251. In this way, a dialog/notification subscription is setup between the control module 210 and the device 251 which has recently registered against the specific AOR.

At this point, whenever a call is made to the device 251, the device 251 sends an SIP 'NOTIFICATION' message to the control module 210 that a call has been made. The notification message contains the call information relating to the call including contact information about the caller.

At path-4, the present embodiment illustrates the registration of another SIP compatible endpoint device 255 to the specific AOR. In this case, the device 255 sends an SIP 'REGISTER' message to the registrar 410. In this way, the registrar is able to communicate to the proxy server 230 that the device 255 is registering against the specific AOR. As such, the proxy server is able to route calls to the SIP compatible endpoint device 255. For example, the device 255 may be located in a foreign country (e.g., China) as the user is traveling, while the device 251 is located at the work location in the United States.

Correspondingly, along path-5 an SIP 'NOTIFICATION' message is sent by the registrar 410 informing the control module 210 that device 255 has registered against the specific AOR. In addition, along path-6, the control module 210 sends an SIP 'SUBSCRIBE' message to the device 255. In this way, a dialog/notification subscription is setup between the control module 210 and the device 255 which has recently registered against the specific AOR. As such, any call to the device 255 results in an SIP 'NOTIFICATION' message being sent informing the control module 210 of the call, along with the requisite call information that can be permanently recorded.

At path-7, the device 255 sends an SIP 'REGISTER' message that contains a termination flag therein to the registrar 410. As such, the device 255 is terminating all present communication sessions to the device 255 using the specific AOR. The device will not be associated with the AOR until re-registering.

As a result, the registrar 410 sends an SIP 'NOTIFICATION' message to the control module that the device 255 has unregistered. As such, the corresponding SIP dialog/notification session is also terminated. That is, the control module does not expect the device 255 to send notifications that a call has been made to the device 255 along with the call information.

Figure 5:
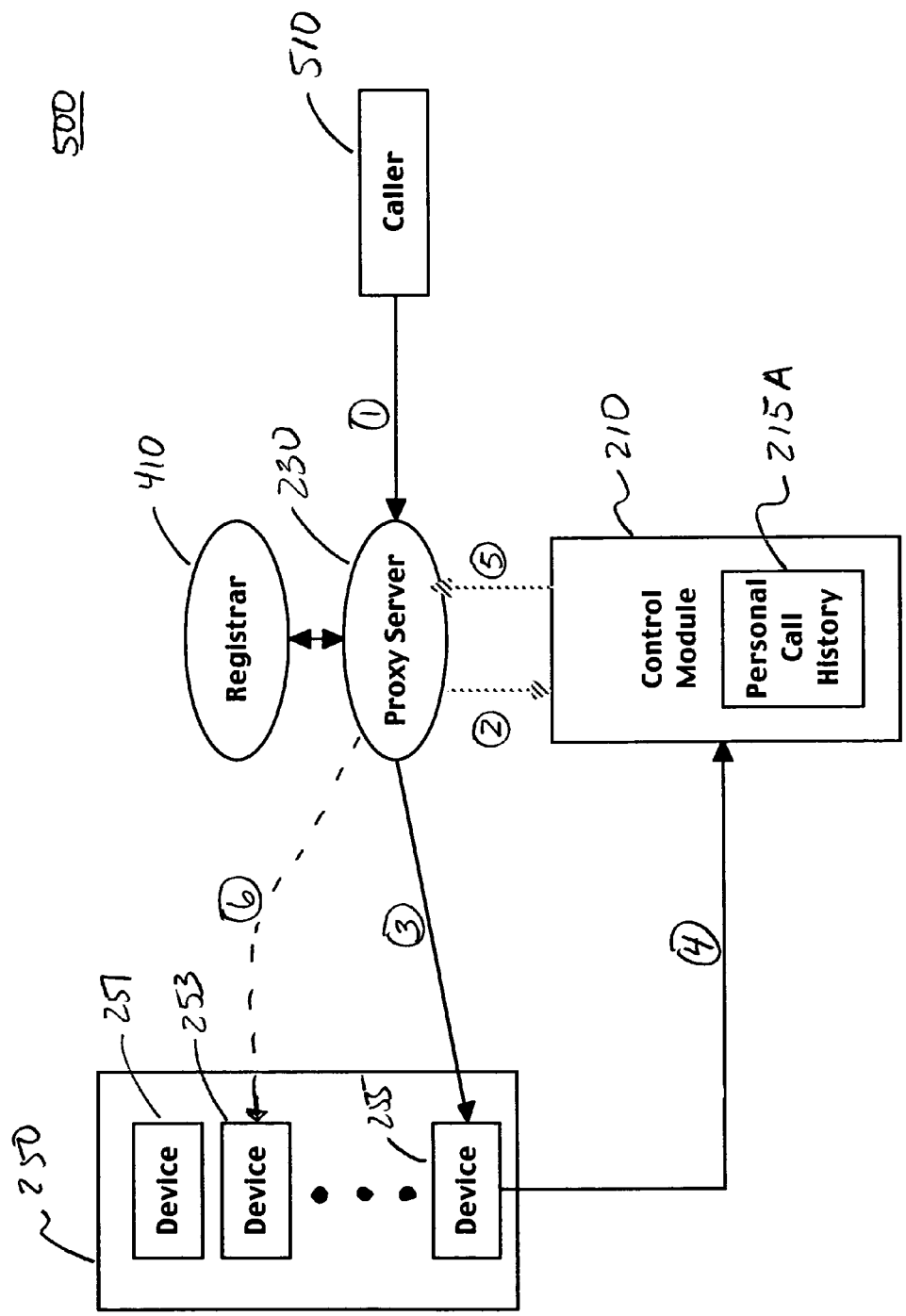
FIG. 5 is a data flow diagram illustrating the process used for automatically storing call information related to a call made to an SIP compatible endpoint device that is associated with one or more associated SIP compatible endpoint devices, in accordance with one embodiment of the present invention.

FIG. 5 is a data flow diagram 500 illustrating the flow of information used for automatically storing call information related to a call made to an SIP compatible endpoint device that is associated with an AOR, in accordance with one embodiment of the present invention. The AOR is associated with one or more associated SIP compatible endpoint devices. The data flow of diagram 500 is implemented within a system as described in FIG. 2, in one embodiment.

As such, the system as shown in data flow diagram 500 comprises one or more associated SIP compatible endpoint devices 250, each of which is associated with a single AOR. In addition, the system comprises a registrar 410 for registering the one or more associated SIP compatible endpoint devices. In this way, the one or more associated SIP compatible endpoint devices 250 can communicate with other endpoint devices. The system also comprises a proxy server 230 for routing calls to the one or more associated SIP compatible endpoint devices 250. In addition, a control module 210 collects call information associated with calls directed to one or more SIP compatible endpoint devices 250 over existing SIP dialog/notification sessions. In this way, a continuously updated personal call history 215A is generated and permanently stores the call information.

As shown in FIG. 5, the present embodiment illustrates a call coming into the proxy server 230 from a caller 510 along path-1. The caller 510 is associated with an SIP compatible device.

At path-2, the present embodiment enables communication between the proxy server 230 and the control module 210 to determine the proper endpoint device to route the call to according to filters and rules specified by the user associated with the specific AOR associated with the one or more SIP compatible endpoint devices 250. That is, the control module 210 can access the personal call history 215A to determine which endpoint device in the one or more associated SIP compatible endpoint devices should receive the call.

In another embodiment, path-2 is bypassed. The filters and rules are implemented after the device 255 has notified the control module 210 that a call has been made to device 255, as will be described in path-4 and path-5.

At path-3, the proxy server 230 routes the call to the proper endpoint device (e.g., device 255) in the one or more SIP compatible endpoint devices 250 that are associated with the AOR specified in the call. The call is routed based on user selection or rules implemented directly by the proxy server, or after analysis by the control module 210.

At path-4, the device 255 sends an SIP 'NOTIFICATION' message to the control module 210 informing the control module that a call has been made to the device 255. Previously, an SIP dialog/notification session has been established between the device 255 and the control module 210, as described previously in the discussion relating to FIG. 4.

The control module 210 at this point records the call information related to the call to the device 255. In addition, the control module 210 also filters the call information, and applies rules to the call information. For example, after application of a rule, the control module might determine that the call needs to be re-routed to device 253. For instance, the rule may state that if a call comes from caller 510 and it is the third call of the day, then route the call to the cell phone that comprises device 253. As a result, the control module 210 informs the proxy server 230 that the call should be re-routed to device 253 as indicated by path-6.

Accordingly, various embodiments of the present invention are described illustrating a method and system for recording call contact information using SIP dialog subscriptions to one or more associated endpoint devices. Embodiments of the present invention provide for permanent storage of a chronological history of call information corresponding to calls made to one or more associated endpoint SIP devices. Embodiments of the present invention are capable of interfacing with any SIP endpoint device as it uses the standard SIP communication protocol, or its derivatives. In addition, embodiments of the present invention are capable of interfacing with any SIP endpoint device regardless of the physical location of the SIP endpoint device or its mobility. Moreover, embodiments of the present invention are capable of recording call information even when calls to endpoint devices are not connected through proxy servers.

While the methods of embodiments illustrated in flow chart 300 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for automatically recording call information from calls directed to one or more associated SIP compatible devices are described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A method for automatically collecting information relating to calls, comprising:

establishing one or more subscription sessions with one or more endpoint devices, wherein each of said one or more endpoint devices is associated with an address of record;

receiving a dialog notification in one of said one or more of subscription sessions that an endpoint device has received a call from a caller;

generating a call entry providing call information associated with said call and said caller; and storing said call entry in a chronological call history providing call information associated with one or more calls to said one or more endpoint devices;

receiving another notification that another endpoint device has received another call;

generating another call entry providing call information associated with said another call; and storing said another call entry in said chronological call history.

2. The method of claim 1, further comprising:

using a Session Initiation Protocol (SIP) for communication with said one or more endpoint devices, wherein said establishing one or more subscription sessions further comprises:

sending one or more Session Initiation Protocol (SIP) subscribe messages to said one or more endpoint devices to establish said one or more subscription sessions; and wherein said notification comprises an SIP notification message.

3. The method of claim 1, further comprising:

providing access to said chronological call history to review call information related to calls to said endpoint device and to said another endpoint device.

4. The method of claim 1, further comprising:

applying a filter to said call information to update a counter associated with said one or more endpoint devices, wherein said counter tracks an amount of time that said one or more end point devices have been logged on.

5. The method of claim 4, further comprising:

triggering a response when said counter reaches or exceeds a threshold; and sending a message that said threshold has been reached or exceeded.

6. The method of claim 1, wherein said call entry comprises:

said dialog notification and said another notification;

a date of said call and a date said another call; and a time of said call and a time of said another call.

7. The method of claim 1, wherein said establishing one or more subscription sessions further comprises:

receiving a preliminary notification that indicates that said endpoint device has registered to be associated with another of said one or more endpoint devices.

8. The method of claim 7, further comprising:

applying a handling rule to said call information associated with said call to reroute said call to said another of said one or more endpoint devices.

9. The method of claim 1, further comprising:

receiving a termination notification that indicates that said endpoint device has unregistered and is no longer associated with said another of said one or more endpoint devices; and terminating a corresponding subscription session.

10. The method of claim 1, wherein said call is initiated by a first caller and said another call is initiated by a second caller, said second caller being a different caller than said first caller.

11. A system comprising:
a shared registrar for registering a plurality of Session Initiation Protocol (SIP) compatible endpoint devices that communicate on a communication network using SIP, wherein each of said plurality of SIP compatible endpoint devices is associated with an address of record;
a proxy server for routing calls to said plurality of SIP compatible endpoint devices;
a control module for chronologically collecting call information associated with one or more calls directed to said plurality of SIP compatible endpoint devices over existing SIP dialog/notification sessions, wherein said one or more calls are routed to at least one of said plurality of SIP compatible endpoint devices according to said associated address of record; and
an updated personal call history for storing said call information for said plurality of SIP compatible endpoint devices.

12. The system of claim 11, wherein said personal call history comprises:
a plurality of call entries, each of which comprises call information associated with a corresponding call to at least one of said plurality of said SIP compatible endpoint devices.

13. The system of claim 12, wherein each of said plurality of call entries comprises:
a dialog notification from a corresponding SIP compatible endpoint device that has received a call;
date of said call; and
time of said call.

14. The system of claim 11, wherein said one or more calls comprises one or more multimedia calls established using a protocol substantially complying with SIP.

15. The system of claim 11, further comprising:
a display for displaying said personal call history for ready access.

16. The system of claim 11, further comprising:
a counting module that updates at least one counter by applying a filter to said call information, wherein said counting module is associated with said plurality of SIP compatible endpoint devices.

17. The system of claim 16, further comprising:
a trigger module that invokes a response when said at least one counter reaches a threshold, wherein said plurality of SIP compatible endpoint devices comprises a first called device and a second called device associated with a single address of record.

18. The system of claim 17, further comprising:
a handler that applies at least one handling rule to said call information for rerouting a corresponding call addressed to said first called device, wherein said corresponding call is rerouted to said second called device according to said at least one handling rule prior to being received by said first called device.

19. The system of claim 11, further comprising:
an access device remotely located from said control module and said personal call history for accessing said personal call history, wherein said access device is configured to communicate said call information to each of said plurality of endpoint devices.

20. The system of claim 11, wherein said personal call history application module comprises a Dialog State Aggregator (DSA).

21. A computer system, comprising:
a processor; and
a computer readable memory coupled to said processor and containing program instructions that, when executed, implement a method for automatically collecting information relating to calls, comprising:
establishing one or more subscription sessions with a plurality of endpoint devices including a first endpoint and a second endpoint, wherein each of said plurality of endpoint devices is associated with an address of record;
receiving a first dialog notification that said first endpoint device has received a call from a caller;
generating a first call entry providing call information associated with said first endpoint device in response to receiving said first dialog notification;
receiving a second dialog notification that said second endpoint device has received a call from another caller;
generating a second call entry providing call information associated with said second endpoint device in response to receiving said second dialog notification; and
storing said first call entry and said second call entry in a shared call history.

22. The computer system of claim 21, wherein said method further comprises:
using a Session Initiation Protocol (SIP) for communication with said plurality of endpoint devices, wherein said establishing one or more subscription sessions further comprises:
sending one or more Session Initiation Protocol (SIP) subscribe messages to said plurality of endpoint devices to establish said one or more subscription sessions; and
wherein said notification comprises an SIP notification message.

23. The computer system of claim 21, wherein said method further comprises:
providing access to said shared call history to review call information related to calls to said plurality of endpoint devices.

24. The computer system of claim 21, wherein said method further comprises:
applying a filter to said call information to update a counter associated with said plurality of endpoint devices.

25. The computer system of claim 24, wherein said method further comprises:
triggering a response when said counter reaches a threshold.

26. The computer system of claim 21, wherein said method further comprises:
applying a handling rule to reroute one or more calls to another endpoint device, wherein the handling rule comprises a total amount of time that said plurality of endpoint devices have collectively been logged on.

27. The computer system of claim 21, wherein said first call entry comprises:
said first dialog notification;
a date of said first call; and
a time of said first call.

28. The computer system of claim 21, wherein said establishing one or more subscription sessions in said method further comprises:
receiving a preliminary notification that indicates that said first endpoint device has registered to be associated with said plurality of endpoint devices.

29. The computer system of claim 28, wherein said method further comprises:
receiving another notification that indicates that said first endpoint device has unregistered and is no longer associated with said plurality of endpoint devices, and a corresponding subscription session is terminated.

30. The system of claim 21, wherein call information associated with said first and second call entries is accessible from said shared call history by any of said plurality of endpoint devices.

31. A computer readable storage medium containing executable instructions which, when executed in a processing system, causes the processing system to collect call contact information, comprising:
   establishing one or more subscription sessions with a plurality of endpoint devices including a first endpoint device and a second endpoint device;
   receiving a dialog notification in one of said one or more subscription sessions that said first endpoint device has received a call from a caller;
   generating a first call entry providing call information associated with said call received by said first endpoint device;
   receiving a dialog notification in one of said one or more subscription sessions that said second endpoint device has received a call from a caller;
   generating a second call entry providing call information associated with said call received by said second endpoint device; and
   storing said first call entry and said second call entry in a shared call history to provide associated call information to said plurality of endpoint devices, wherein said shared call history is located remotely from said first and second endpoint devices.

32. The computer readable medium of claim 31, wherein said method further comprises:
   using a Session Initiation Protocol (SIP) for communication with said plurality of endpoint devices, wherein said establishing one or more subscription sessions further comprises:
   sending one or more Session Initiation Protocol (SIP) subscribe messages to said plurality of endpoint devices to establish said one or more subscription sessions; and
   wherein said notification comprises an SIP notification message.

33. The computer readable medium of claim 31, wherein said method further comprises:
   storing said first call entry and said second call entry in chronological order, wherein said call history includes an identification of which of said first and said second endpoint devices are associated with said first and second call entries.

34. The computer readable medium of claim 31, wherein said method further comprises:
   providing access to said shared call history for each of said plurality of endpoint devices to review call information related to calls received by another of said plurality of endpoint devices.

35. A system for collecting information relating to calls, comprising:
   means for registering two or more Session Initiation Protocol (SIP) compatible endpoint devices that communicate on a communication network using SIP, wherein each of said two or more SIP compatible endpoint devices is associated with an address of record;
   means for routing calls to each of said two or more SIP compatible endpoint devices;
   means for chronologically collecting call information associated with a plurality of calls directed to said two or more SIP compatible endpoint devices over existing SIP dialog/notification sessions; and
   means for storing said call information in a personal call history, wherein said means for storing said call information is maintained remotely from said two or more SIP compatible end-point devices.

36. The system of claim 35, wherein said personal call history comprises:
   one or more call entries, each of which comprises call information associated with a corresponding call to a corresponding SIP compatible endpoint device.

37. The system of claim 35, wherein each of said two or more call entries comprises:
   a dialog notification from a corresponding SIP compatible endpoint device that has received a call;
   date of said call; and
   time of said call.

38. The system of claim 35, wherein said two more calls comprises one or more multimedia calls established using a protocol substantially complying with SIP.

39. The system of claim 35, further comprising:
   means for displaying said personal call history for ready access.

40. The system of claim 35, further comprising:
   means for accessing said personal call history.

41. A system for collecting information relating to calls, comprising:
   a control module for chronologically collecting call information associated with a plurality of calls directed to two or more Session Initiation Protocol (SIP) compatible endpoint devices wherein said call information is stored remotely from said two or more endpoint devices, wherein said control module is remotely located from said two or more endpoint devices, and wherein at least one of said two or more endpoint devices is configured to access said control module to retrieve said call information.

42. The system of claim 41, wherein said control module permanently stores said call information in an updated personal call history.

43. The system of claim 42, wherein said personal call history comprises:
   one or more call entries, each of which comprises call information associated with a corresponding call to one of said two or more endpoint devices.

44. The system of claim 43, wherein each of said one or more call entries comprises:
   a dialog notification from a corresponding endpoint device that has received a call;
   date of said call; and
   time of said call.

45. The system of claim 42, wherein said personal call history comprises a database which is maintained remotely from said two or more endpoint devices.

* * * * *

UNITED STATES PATENT AND TRADEMARK OFFICE
CERTIFICATE OF CORRECTION

PATENT NO.       : 7,467,210 B1
APPLICATION NO.  : 10/816995
DATED            : December 16, 2008
INVENTOR(S)      : Anup V. Rao Page 1 of 1

It is certified that error appears in the above-identified patent and that said Letters Patent is hereby corrected as shown below:

At column 12, line 41 of Claim 4, please delete "end point" and insert -- endpoint --, therefor.

In Claim 6, please delete ""a date of said call and a date said another call; and" and insert -- a date of said call and a date of said another call; and --, therefor.

At column 16, line 10 of Claim 35, please delete "end-point" and insert -- endpoint --, therefor.

At column 16, line 22 of Claim 38, please delete "two more" and insert -- plurality of --, therefor.

At column 16, line 36 of Claim 41, please delete "devices" and insert -- devices, --, therefor.

Signed and Sealed this

Twelfth Day of May, 2009

JOHN DOLL
*Acting Director of the United States Patent and Trademark Office*